United States Patent
Sakabe et al.

(10) Patent No.: US 8,634,687 B2
(45) Date of Patent: Jan. 21, 2014

(54) COATED PLASTIC CLADDING OPTICAL FIBER AND OPTICAL FIBER CABLE

(75) Inventors: Itaru Sakabe, Yokohama (JP);
Kazuyuki Sohma, Yokohama (JP);
Tomoyuki Hattori, Yokohama (JP);
Takashi Takada, Yokohama (JP);
Toshiaki Kakii, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 120 days.

(21) Appl. No.: 13/321,967

(22) PCT Filed: Apr. 18, 2011

(86) PCT No.: PCT/JP2011/059561
§ 371 (c)(1),
(2), (4) Date: Nov. 22, 2011

(87) PCT Pub. No.: WO2012/144005
PCT Pub. Date: Oct. 26, 2012

(65) Prior Publication Data
US 2012/0177329 A1 Jul. 12, 2012

(51) Int. Cl.
*G02B 6/02* (2006.01)
(52) U.S. Cl.
USPC .......................................................... 385/123
(58) Field of Classification Search
USPC .......................................................... 385/123
See application file for complete search history.

(56) References Cited

U.S. PATENT DOCUMENTS

| 5,652,821 A * | 7/1997 | Okumi et al. ................. 385/145 |
| 7,187,829 B2 * | 3/2007 | Anderson et al. ............. 385/100 |
| 2005/0201713 A1 * | 9/2005 | Sato ............................... 385/143 |

FOREIGN PATENT DOCUMENTS

| JP | 57-106539 | 7/1982 |
| JP | 1-295207 | 11/1989 |
| JP | 06-174940 | 6/1994 |
| JP | 9-281346 | 10/1997 |
| JP | 2001-264597 | 9/2001 |
| JP | 2005-19540 | 1/2005 |
| JP | 2006-178086 | 7/2006 |
| JP | 2008-058664 | 3/2008 |
| JP | 2009-198695 | 9/2009 |
| JP | 2011-85854 | 4/2011 |
| WO | WO 2008/096637 A1 | 8/2008 |
| WO | WO 2009/104724 A1 | 8/2009 |

* cited by examiner

*Primary Examiner* — Omar Rojas
(74) *Attorney, Agent, or Firm* — Drinker Biddle & Reath LLP

(57) ABSTRACT

A coated plastic cladding optical fiber and an optical fiber cable, in which a transmission loss caused when this coated fiber or this fiber cable is bent in a small radius is small, and which can be used sufficiently as a USB cable or a HDMI cable in a high speed transmission, are provided.
The coated plastic cladding optical fiber 1 has a cladding layer 3 that is formed on an outer periphery of a core glass 2 made of a quartz glass and formed of a polymer resin whose refractive index is lower than core glass, and a resin coating layer 5 that is formed on an outer periphery of the cladding layer 3 and is formed of a thermosetting resin. Then, a diameter of the core glass 2 is set to 50 to 100 μm, and a relative index difference of the core glass 2 to the cladding layer 3 is set to 3.7% or more.

8 Claims, 5 Drawing Sheets

COATED PLASTIC CLADDING OPTICAL FIBER AND OPTICAL FIBER CABLE

TECHNICAL FIELD

The present invention relates to a coated plastic cladding optical fiber and an optical fiber cable and, more particularly, a coated plastic cladding optical fiber and an optical fiber cable for use in a USB cable or a HDMI cable (or cord) used in ordinary houses, offices, etc., a portable phone, and the like.

BACKGROUND ART

As one type of the coated optical fibers, there is a coated optical fiber that is called a coated hard polymer cladding fiber (referred to as a "coated HPCF" hereinafter)(Patent Literature 1, for example). In this coated HPCF, a HPCF is formed by coating a fluorinated resin, whose refractive index is lower than a quartz glass, on an outer periphery of a core glass, which is formed of a quartz glass and whose core diameter is 195 to 205 μm, as a cladding layer whose thickness is about 15 μm. The coated HPCF whose outer diameter is 0.5 mm or 0.9 mm is formed by extruding a resin coating layer formed of a fluorinated thermoplastic resin onto this HPCF to coat the HPCF.

In the coated HPCF, a transmission loss is heavy but a core diameter is large. Therefore, the coated HPCF can enhance a coupling efficiency between a pulse light source and a photodetector, and can facilitate a connection between them. As a result, this coated HPCF is used in short-distance fields such as FA (Factory Automation), etc.

PRIOR TECHNICAL LITERATURE

Patent Literature

Patent Literature 1: JP-A-2001-264597

SUMMARY OF THE INVENTION

Problems that the Invention is to Solve

However, it is required of the coated HPCF that, even when this coated HPCF is wound around the bobbin or an ambient temperature is changed, a transmission loss should not be increased. In this case, in the coated HPCF whose core diameter is not less than 200 μm, a transmission loss is increased when this coated HPCF is bent in a small radius. Also, breakage of a glass is brought about when the coated HPCF is held in its bent state for a long time. For this reason, an allowable bend radius of the coated HPCF is restricted commonly to 15 mm or more. As a result, the care must be taken in setting up the coated HPCF. The coated HPCF can be used in the factory, etc.; however, such coated HPCF cannot be used without anxiety in ordinary houses, offices, etc. to provide the wiring between equipments.

The present invention has been made to solve the above problem, and it is an object of the present invention to provide a coated plastic cladding optical fiber and an optical fiber cable, in which an amount of increase in a transmission loss is small even when this coated fiber or this fiber cable is bent in a small radius (a bend radius is 2 mm), as the cable for wiring between equipments, such as the USB cable, the HDMI cable, or the like.

In addition to the above, it is another object of the present invention to provide a coated plastic cladding optical fiber and an optical fiber cable, in which an amount of increase in a transmission loss caused due to a change in temperature is made small and also a connection loss is made small.

Further, in addition to the above, it is still another object of the present invention to provide a coated plastic cladding optical fiber and an optical fiber cable, in which there is no risk of causing a core breakage even when the coated HPCF is held in its bent state for a long time and which can be used without anxiety in the ordinary houses, the offices, etc.

Means for Solving the Problems

The structure of the present invention is as shown below.

(1) A coated plastic cladding optical fiber constructed by forming a coating layer, which is formed of a thermosetting resin, on a plastic cladding optical fiber, in which a cladding layer formed of a resin whose refractive index is lower than core glass is formed on an outer periphery of the core glass formed of quartz glass, wherein a diameter of the core glass is set to 50 to 100 μm, and a relative index difference of the core glass to the cladding layer is set to 3.7% or more.

(2) It is preferable that a diameter of the cladding layer is 1.4 to 2.5 times the core diameter.

(3) It is preferable that a static fatigue factor of the plastic cladding optical fiber is set to 22 or more.

Advantages of the Invention

According to the coated plastic cladding optical fiber and the optical fiber cable of the present invention, a transmission loss caused due to the bending is made small. Also, even when an ambient temperature is changed, an increase in a transmission loss is made small, and also a connection loss is made small. Further, even when the optical fiber cable is bent in a bend radius of 2 mm or less as the USB cable or the HDMI cable, there is no risk of causing the core breaking, and a breaking probability can be reduced smaller to $10^{-6}$ or less, and such optical fiber cable can be used without anxiety in the ordinary houses, the offices, etc. Moreover, such optical fiber cable can be used at a high-speed transmission of 10 Gbps.

MODE FOR CARRYING OUT THE INVENTION

An embodiment of a coated plastic cladding optical fiber (referred simply to as a "coated PCF" hereinafter) and an optical fiber cable according to the present invention will be explained with reference to the drawings hereinafter.

Figure 1:
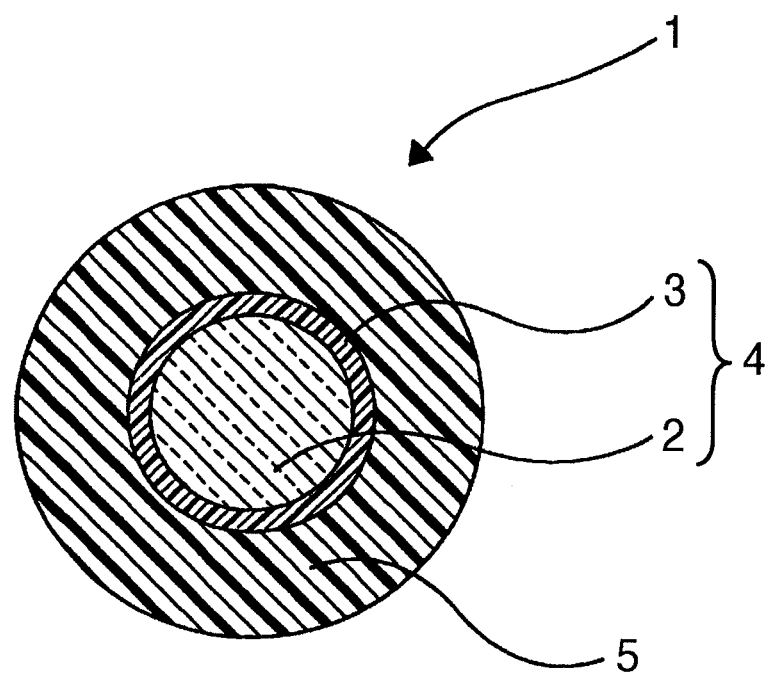
FIG. 1 A schematic sectional view showing an example of a coated plastic cladding optical fiber of the present invention.

As shown in FIG. 1, a coated PCF 1 includes a plastic cladding optical fiber (referred simply to as a "PCF" hereinafter) 4 that consists of a core glass 2 formed of a quartz glass, and a cladding layer 3 formed of an ultraviolet curable fluororesin such as an ultraviolet curable acrylate fluoride resin, a reflective index of which is lower than the core glass 2, so as to surround an outer peripheral surface of the core glass 2. Also, the coated PCF 1 includes a resin coating layer 5 formed of a fluorinated thermoplastic resin such as an ethylene-tetrafluoroethylene copolymer (ETFE), or the like, on the outer periphery of this cladding layer 3.

Figure 2:
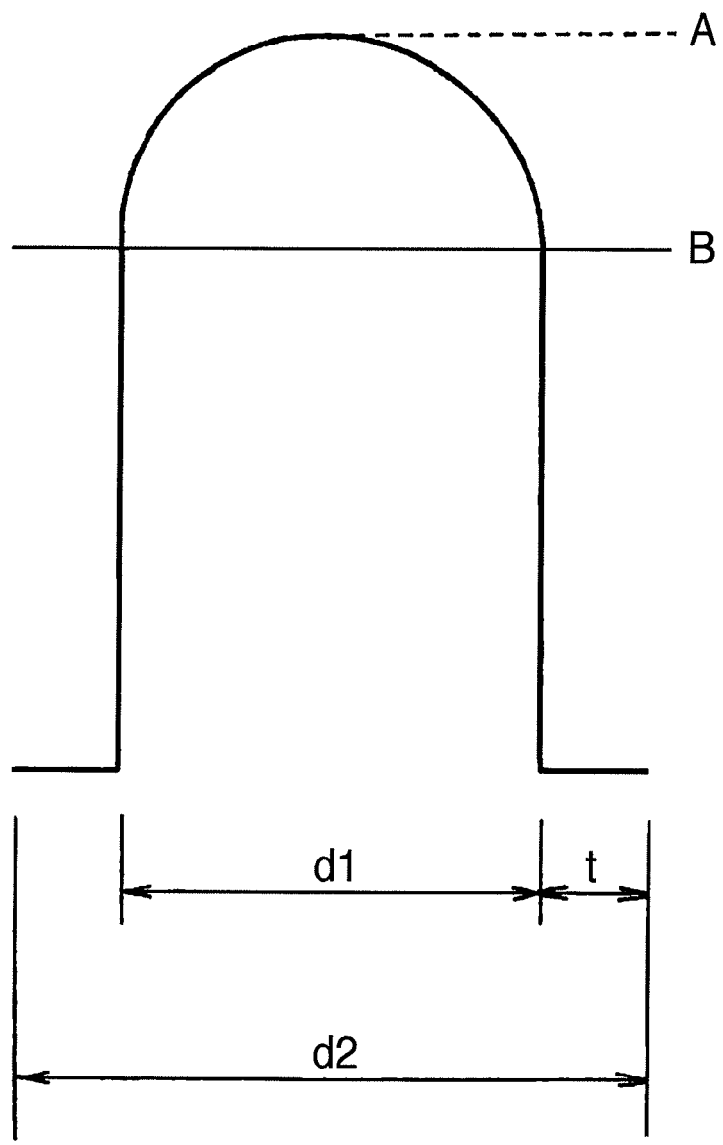
FIG. 2 An explanatory view showing a refractive index profile of a plastic cladding optical fiber in FIG. 1.

As shown in FIG. 1 and FIG. 2, respective dimensions of the coated PCF 1 according to the present embodiment are given as follows.

a core diameter d1 of the core glass 2: 50 to 100 μm
a cladding diameter d2 of the cladding layer 3: 90 to 175 μm
a thickness t of the cladding layer 3: 20 to 37.5 μm
a cladding diameter d2/core diameter d1: 1.4 to 2.5
an outer diameter of the resin coating layer 5: 250 to 500 μm A refractive index of the core glass 2 of the PCF 4 is enhanced by adding germanium (Ge). As the refractive index profile of the core glass 2, there are the graded index (GI) profile and the step index (SI) profile. In the GI type, a relative index difference Δ is enhanced gradually toward a center from an outer peripheral surface and then a relative index difference Δ reaches a maximum (A level) at a center of the core glass 2. In the SI type, a refractive index of the core glass 2 is kept at a substantially constant value. For example, a relative index difference Δ of an outer periphery of the core glass is set to zero (B level) in contrast with the pure silica. A refractive index of the cladding layer 3 is set lower by adding fluorine. A relative index difference of the core glass 2 to the cladding layer 3 is not less than 3.7%. It is preferable that the numerical aperture of the coated PCF of the present invention should be set to 0.40 or more.

It is essential for the resin of the cladding layer 3 that its refractive index should be set lower than the core glass 2 and such resin should be cured by an activation energy such as an ultraviolet radiation, or the like. Also, it is essential for such resin that the cured substance that is excellent in mechanical strength, flexibility, and transparency should be obtained by the curing.

It is preferable that, as such resin, a resin composite formed of (a) (meta)acrylate monomer or polymer containing a fluorine atom in a molecule, (b) (meta)acrylate monomer or polymer, (c) a coupling agent that produces a chemical bond together with a core material, or (d) a photopolymerization initiator should be employed.

A desirable refractive index can be obtained either by changing the number of fluorine atoms or the component in the molecule of the component (a), or by changing a concentration of the component (a) in the resin composite. A substance given by Chemical Formula (A) may be listed as the (meta)acrylate monomer (a1) containing fluorine atoms in the molecule, or a substance given by any one of Chemical Formulae (B1) to (B3) may be listed as the substance having two unsaturated bonds or more.

Chemical Formula (A)

[Formula 1]

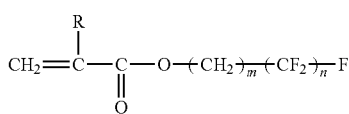

R: H or CH$_3$, m = 1 to 2, n = 1 to 8

Chemical Formula (B1)

[Formula 2]

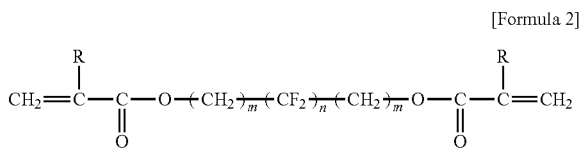

R: H or CH$_3$, m = 1 to 2, n = 2 to 6

Chemical Formula (B2)

[Formula 3]

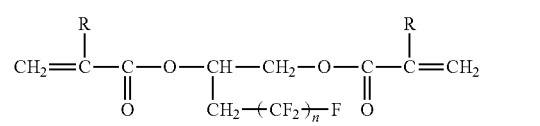

R: H or CH$_3$, n = 4 to 10

Chemical Formula (B3)

[Formula 4]

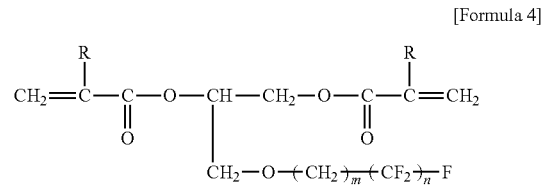

R: H or CH$_3$, m = 1 to 2, n = 4 to 10

As given by Chemical Formula (C) in which a number average molecular weight is fifty thousands to five millions (in terms of styrene), (meta)acrylate copolymer having ester side-chain unsaturated bonds may be listed as the (meta)acrylate polymer (a2) containing a fluorine atom.

[Formula 5]

Chemical Formula (C)

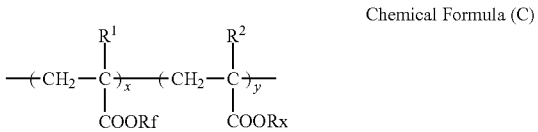

[In above Formula, R1 and R2 denote hydrogen or a methyl group respectively, Rf denotes a fluoroalkyl group, and Rx denotes a hydrocarbon group having unsaturated bonds.]

As the Rx group, a vinyl group, an allyl group, an acryl group, a methacryl group, an internal olefin, and the like may be listed.

As the Rf group, —(CH2)a-(CF2)b-CF3 may be listed [in above Formula, a denotes 1 or 2, and b denotes 2 to 6.]

As the (meta)acrylate monomer (b), for example, following compounds may be listed as the compound having a crosslinking power, i.e., two unsaturated bonds or more.

1,4-butanediol di(meta)acrylate, ethylene glycol di(meta)acrylate, glycerol dimethacrylate, tetraethylene glycol di(meta)acrylate, diethylene glycol di(meta)acrylate, 1,3-butylene glycol di(meta)acrylate, neopentyl glycol di(meta)acrylate, triethylene glycol di(meta)acrylate, triglycerol diacrylate, 1,6-hexanediol di(meta)acrylate, tripropylene glycol diacrylate, trimethylolpropane tri(meta)acrylate, pentaerythritol triacrylate, pentaerythritol tetra(meta)acrylate, ditrimethylolpropane tetraacrylate, dipentaerythritol hexaacrylate.

As the coupling agent (c), for example, following compounds may be listed.

trimethoxyvinylsilane, methacryloxypropyl trimethoxysilane, dimethylethoxyvinylsilane, and the like.

Also, as the compound having two unsaturated bonds or more in a molecule, for example, following compounds may be listed.

diethoxydivinylsilane, dimethoxydivinylsilane, dimethacryloxypropyl trimethoxysilane, and the like.

As the photopolymerization initiator (d), the compound that generates a radical easily in response to the ultraviolet irradiation is desirable, and following compounds may be listed, for example.

benzophenone, acetophenone, benzyl, benzoin, benzoin methyl ether, benzoin isobutyl ether, benzyl dimethylketal, α,α'-azobisisobutyronitrile, benzoyl peroxide, 1-hydroxycyclohexyl phenyl ketone, 2,2-dimethoxy-2-phenylacetophenone, 2-hydroxy-2-methyl-1-phenylpropane-1-on.

In manufacturing the cladding layer 3, such a mode is preferable that a resin liquid should be uses as the resin composite having the above structure, then this resin liquid should be coated on the core, and then an ultraviolet light should be irradiated onto the resultant structure. It is preferable that the dice coating system should be employed as the method of coating the resin liquid.

The resin coating layer 5 may be formed by the resin composite formed of a thermoplastic resin whose thermal resistance is high. As the thermoplastic resin, for example, an ethylene-tetrafluoroethylene copolymer (ETFE), and the like may be listed. Alternately, an ultraviolet curable resin such as a urethane acrylate resin, a resin formed by mixing an epoxy acrylate resin, a polyester acrylate resin, or the like in a urethane acrylate resin, or the like may also be used.

In the coated PCF 1, when such conditions are applied that a core diameter d1 of the core glass 2 is set to 50 to 100 μm and that a relative index difference of the core to the cladding is set to 3.7% or more, an amount of increase in a transmission loss caused by a light of a wavelength of 850 nm while the coated PCF 1 is being bent in a radius of 2 mm can be suppressed smaller than 0.4 dB/10 turns. Accordingly, the USB cable or the HDMI cable containing this coated PCF can be employed in the ordinary houses, the offices, etc.

Further, in the coated PCF 1, when such a condition is applied that a thickness of the cladding layer 3 is set to 20 μm or more, an amount of increase in a transmission loss caused by a light of a wavelength of 850 nm at a time of change in temperature within −40° C. to 85° C. can be suppressed lower than 0.3 dB.

It may be considered that, when the cladding layer is formed thin, a microbend loss is increased and thus an increase in a transmission loss caused due to a change in the ambient temperature is increased. Here, "an increase in a transmission loss caused due to a change in the temperature" indicates an increase in a transmission loss detected after a heat cycle, in which a temperature of the atmosphere where a test piece is put is changed from a room temperature→80° C.→−45° C.→the room temperature, is repeated ten times. It is assumed that the test piece should be held at 80° C. and −45° C. for 2 to 4 hours respectively and that a rate of change when the temperature is changed should be set to 1° C./min. When a thickness of the cladding layer is set to 20 μm in the situation that a core diameter is 100 μm, a ratio of the cladding diameter/the core diameter has a minimum value of 1.4.

An amount of offset of a center of the core from a center of the cladding is increased larger as a thickness of the cladding layer becomes thicker. When the PCF is to be connected to other PCF or other optical fiber, these PCFs are connected such that both outer peripheries of the cladding layers match closely. At this time, when the center of the core is offset from the center of the cladding, the cores are connected mutually in their offset state. Accordingly, a light that propagates through the core leaks out from the connected location, and as a result a connection loss is increased. When a thickness of the cladding layer is set to 37.5 μm or less, an amount of offset of the center of the core from the center of the cladding becomes small, so that a connection loss of the light whose wavelength is 850 nm can be suppressed within the range (0.5 dB or less) in which no problem is caused in a practical use. Accordingly, it is preferable that a thickness of the cladding layer should be set to 37.5 μm or less. When a core diameter is 50 μm and a thickness of the cladding layer is set to 37.5 μm, a ratio of the cladding diameter/the core diameter has a maximum value of 2.5.

There is a risk that the optical fiber may be broken by a static fatigue when such optical fiber is held in its bent state for a long time. In many cases the USB cable or the HDMI cable is held in its bent state. Therefore, the PCF used in these cables is expected to have a low probability of the static fatigue break even when such PCF is put in its bent state for a long time. It is preferable that the PCF of the present invention should have a breaking probability of $10^{-6}$ (1 ppm) or less.

A breaking probability F can be calculated based on a static fatigue factor (n value) by Computational Expression given as follows.

$$F = 1 - \exp(X)$$

$$X = -Np \cdot L \cdot m/(n-2) \cdot (\sigma s/\sigma p)^n \cdot (ts/tp)$$

Np: breaking frequency in manufacturing a fiber
L: laying length
m: Weibull distribution factor when a crack number distribution N follows a Weibull distribution
σs: distortion of a core at a time of laying
σp: distortion of a core at a time of screening in manufacturing a fiber
ts: term of guarantee
tp: loading time of a screening in manufacturing a fiber
In case X is small, F can be approximated to F=−X.

$$F = Np \cdot L \cdot m/(n-2) \cdot (\sigma s/\sigma p)^n \cdot (ts/tp) \propto (\sigma s/\sigma p)^n \propto \sigma s^n$$

The n value can be calculated by following steps.

(1) A coated PCF 1 having a length of 1 meter is wound around several kinds of mandrels having different radii respectively, and is left as it is. A diameter of the mandrel is set to 1.6 mm, 1.8 mm, 1.9 mm, and 2.0 mm respectively, for example. The number of samples is set to 15, for example, every diameter of the mandrel. Then, a time required until the coated PCF of each sample is broken is measured.

(2) A center value of a breaking time (a time tf at which half of the samples are broken) is detected. When the number of samples is set to 15, a breaking time of the sample that is broken at the 8-th time is given as tf.

(3) A strain applied to the glass (core layer) is calculated based on a diameter T of the mandrel, a glass diameter (core diameter d1) of PCF, and a cladding diameter d2 by following Computational Expression.

Strain={(winding diameter $x$ of an outer periphery of the glass portion)−(winding diameter $y$ of a center of the glass portion)}/(mandrel diameter $T$+cladding diameter $d2$)=(glass diameter $d1$)/(mandrel diameter $T$+cladding diameter $d2$)

Figure 3:
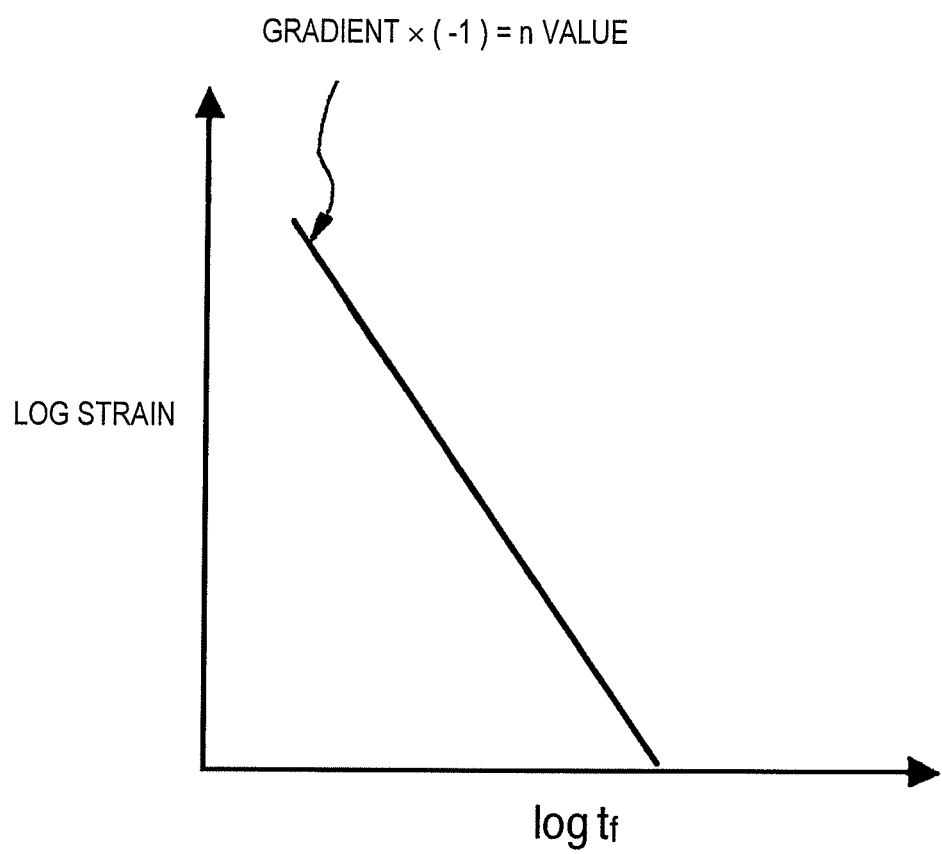
FIG. 3 A view showing how to calculate an n value.

(4) As shown in FIG. 3, a gradient of the graph is detected by plotting log strain vs log tf. The value obtained by multiplying this gradient by −1 yields the n value.

An adjustment of the n value is carried out as follows.

(1) An uncured component is removed from the cladding layer.

(2) The PCF is cooled slowly at a time of the drawing.

(3) The core is coated with a carbon, and then the cladding layer is formed on its outer periphery.

Sometimes the uncured component such as a substance expressed by following Chemical Formula, or the like may be contained in the resin composite that constitutes the cladding layer so as to improve a heat resistance.

[Chemical Formula (1)]

[Formula 6]

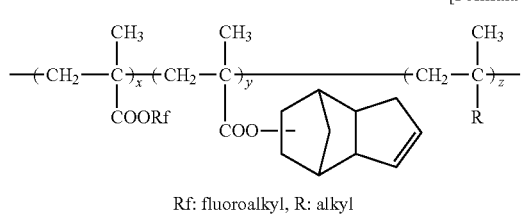

Rf: fluoroalkyl, R: alkyl

It is found that, when the uncured component expressed by above Chemical Formula, or the like is contained in the cladding layer, such component prevents an improvement of a static fatigue factor. Accordingly, it is preferable that the uncured component expressed by above Chemical Formula, or the like should not be contained in the cladding layer.

The method of drawing the PCF is carried out as follows.

First, glass preform is softened by applying the heating, and then this preform is drawn to a predetermined diameter. This drawn portion acts as the core. Then, a liquid cladding material is coated on the core. In detail, the cladding material can be coated on the outer periphery of the core by passing a glass fiber serving as the core through the die in which the liquid cladding material is filled. Then, the cladding material is cured by irradiating an ultraviolet light to the cladding material coating the core.

The glass preform is heated close to one thousand and several hundreds ° C. to two thousand ° C. to soften. The glass fiber that is subjected to the drawing is cooled to several tens ° C. by the air-cooling. At this time, a cooling rate of the glass fiber that was subjected to the drawing is made slow. In other words, when the glass fiber is cooled slowly, minute cracks on the surface of the glass fiber can be reduced further more by the slow cooling, and also a static fatigue factor of the PCF can be increased up to 30 or more. As an example of how to cool slowly the glass fiber, the process of causing the glass fiber, which is in the course of the cooling, to pass through a cylindrical vessel may be listed. The temperature of this vessel may be kept at 500° C. to 1500° C. such that the glass fiber is not quickly cooled, otherwise the temperature control may not be particularly applied.

A value obtained by dividing a difference between a temperature sensed when the glass fiber comes into this vessel (a fiber incoming temperature) and a temperature sensed when the glass fiber goes out of this vessel (a fiber outgoing temperature) by a time that is required of the glass fiber to pass through this vessel gives a slow cooling rate. When the slow cooling rate gets smaller than the cooling rate applied when the glass fiber is cooled from the fiber incoming temperature to the fiber outgoing temperature under the condition that no vessel is equipped, it is possible to say that the glass fiber was cooled slowly.

The glass fiber is coated with carbon and then the cladding layer is formed on its outer periphery, so that a static fatigue factor can be enhanced up to about 300. As an example that the glass fiber is coated with carbon, the process of passing the glass fiber obtained immediately after the drawing through a reaction furnace in which a raw material gas is filled may be listed. The raw material gas is caused to react with the glass fiber due to its heat by the thermal chemical vapor deposition method (the thermal CMD method), and thus a carbon layer is coated on a surface of the glass fiber. As the raw material gas, hydrocarbon such as ethylene, acetylene, chloroform, or the like, halogen carbon hydrocarbon, or the like is employed. As the silanized gas, a compound such as $SiH_4$, $SiHCl_3$, $SiCl_4$, or the like, which is formed of silicon, hydrogen, halogen, and the like, may be mixed.

The coated PCF is formed by coating a resin coating layer such as ETFE, or the like on the manufactured PCF by the extrusion coating, or by coating an ultraviolet curable resin on the manufactured PCF.

Then, the optical cable can be formed by putting the coated PCF of the present invention into the PVC tube. The optical cable may be constructed to have such a loose structure that one or a plurality of coated PCFs are incorporated into the tube and no filler is provided between the coated PCF and the tube. Also, the optical cable may be constructed by providing a tensile strength fiber such as "Kevlar (registered trademark)" around the coated PCF to form a jacket around its periphery by the tube. Also, the optical cable can be used as the photoelectric composite cable in which an electric wire is provided integrally around its periphery.

EXAMPLES

In Examples of the PCF and the coated PCF of the present invention, the core diameter d1 of the core glass 2 was set to 50 μm, 80 μm, and 100 μm respectively and also the cladding diameter d2 was set to 120 μm, 125 μm, and 150 μm respectively. Then, Examples 1 to 5 shown in Table 1 were given based on these combinations. On the contrary, in Comparative examples, the core diameter d1 was set to 50 μm, 80 μm, and 200 μM respectively and also the cladding diameter d2 was set to 80 μm, 110 μm, 150 μm, and 230 μm respectively. Then, Comparative Examples 1 to 4 were given based on these combinations.

In the coated PCFs in Examples 1 to 5 and Comparative Examples 1 to 4, the ETFE was coated on the resin coating layer formed on the outer periphery of the PCF by the extrusion coating so as to form an outer diameter of 500 μm. In Comparative Example 5, both the core and the cladding were formed of glass (silica), and the optical fiber having an outer diameter of 250 μm was formed by coating a urethane-acrylate resin on the outer periphery of the cladding. Then, the coated optical fiber having an outer diameter of 500 μm was formed by coating the ETFE layer on the outer periphery of this optical fiber.

Also, a relative index difference (%) of the core to the cladding was measured. An NA was calculated based on this relative index difference.

As respective Examples, the core obtained by adding germanium (Ge) into the quarts (pure silica) was employed. Owing to addition of Ge, a refractive index of this core was enhanced higher than a refractive index of the core formed of the pure silica only. Since an acrylate fluoride resin was used as the cladding, a refractive index of this cladding was lower than a refractive index of the pure silica. In Example 5, a refractive index of the core was made low by decreasing an amount of addition of Ge in contrast to Examples 1 to 4. The material of the cladding was the same throughout Examples 1 to 5.

The cores in Comparative Examples 1 to 4 were similar to those in Examples 1 to 4. In these Comparative Examples, a refractive index was enhanced higher than those in Examples by decreasing a concentration of fluorine in the cladding material. As a result, in respective Comparative Examples, a relative index difference of the core to the cladding was made smaller than those in respective Examples. Since the cladding in Comparative Example 5 was formed of the pure silica, a refractive index of the cladding was higher than those in other Comparative Examples and also a relative index difference of the core to the cladding was smaller.

The material of the cladding in Example 2 and Example 4 was obtained by removing a substance given by Chemical Formula (1) from the materials of the claddings in Comparative Examples 1 to 4. Accordingly, a static fatigue factor in Example 2 and Example 4 was given as 22, which became large rather than a static fatigue factor of 18 in Comparative Examples 1 to 4.

[Formula 7]

Chemical Formula (1)

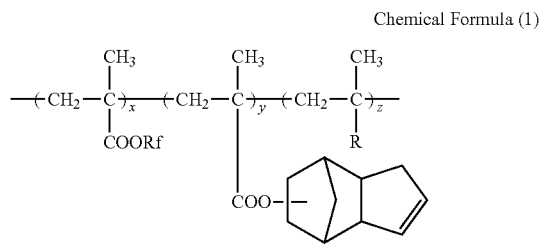

Rf: fluoroalkyl, R: alkyl

In Example 3 and Example 5, the core of the coated PCF was cooled slowly at a time of manufacturing. In this slow cooling, a cooling rate applied while a temperature of the optical fiber is decreased from 2000° C. to 200° C. was set to 900° C./sec. In Example 3 and Example 5, a static fatigue factor (n value) could be set to 30 by using the combination of this slow cooling of the core and the cladding material (similar to Example 2 and Example 4).

The coated PCF in Example 1 was set to have the core and cladding structure similar to those in Example 3 and Example 5, and the core was coated with carbon (a thickness is 5 nm). As a result, in Example 1, a static fatigue factor (n value) could be set to 100.

(Static Fatigue Factor and Breaking Probability)

A static fatigue factor (n value) was derived by the above-mentioned method. Also, the PCF was wound around the mandrel of 2 mm radius (4 mm diameter) by 10 turns and was held for one minute as it is, then was unwound once, and then was wound once again and was held for one minute. After these steps were repeated 100 times, a probability that the core glass 2 is broken only once was calculated based on the n value. It was decided that the PCF was good (OK) when a breaking probability is less than $10^{-6}$ or less whereas the PCF was failure (NG) when a breaking probability is in excess of $10^{-6}$.

Figure 4:
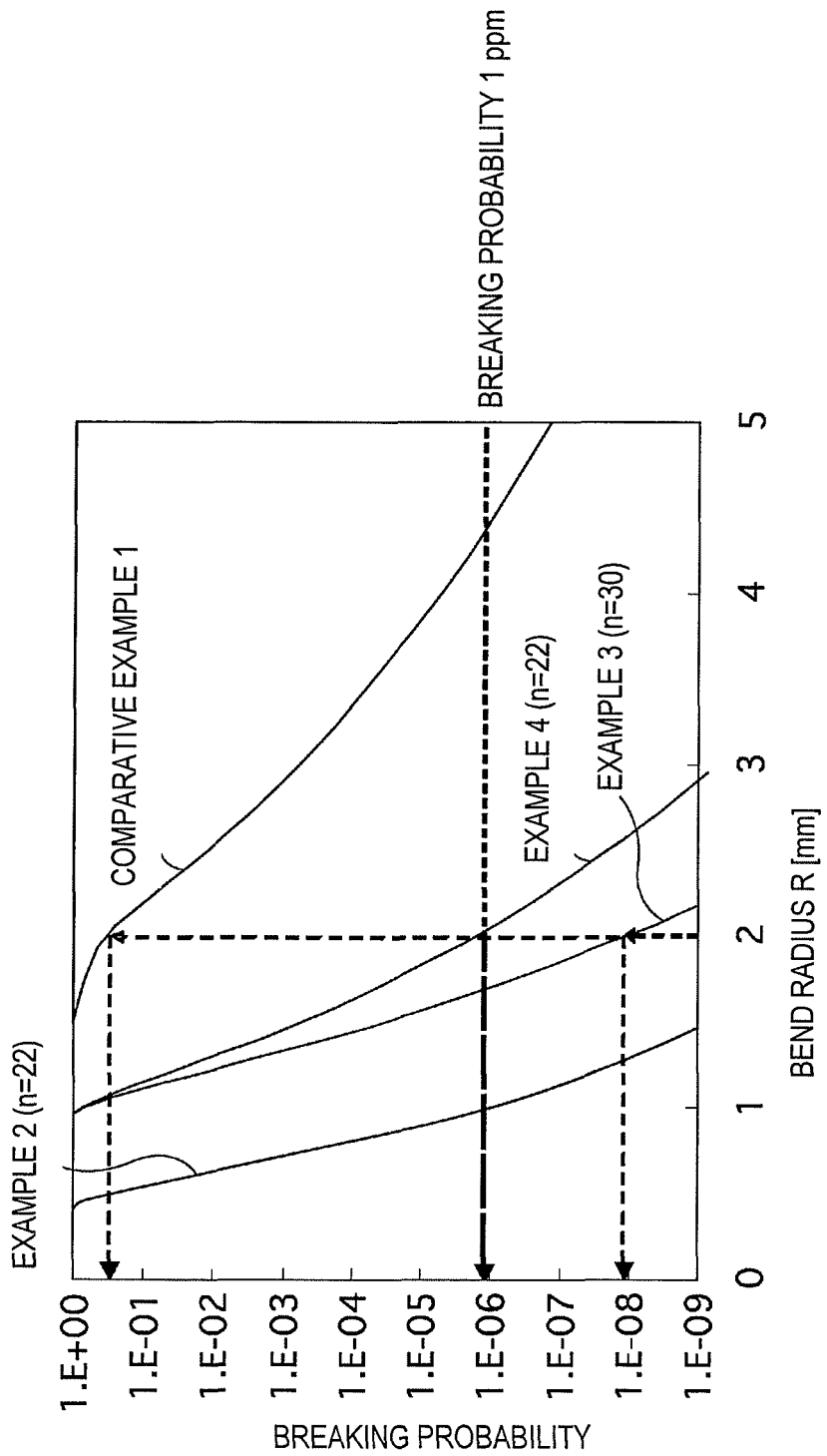
FIG. 4 A view showing a relation between a bend radius and a breaking probability of the plastic cladding optical fiber.

A relation between a breaking probability and a bend radius is shown in FIG. 4.

As shown in FIG. 4, in Example 4 in which the core diameter was 100 μm and the n value was 22, a breaking probability was about 1 ppm after the condition in which the PCF was held for 1 minute on the mandrel whose bend radius is 2 mm was repeated 100 times. In Example 3 in which the core diameter was 80 μm and the n value was 30, a breaking probability was further small. In Example 2 in which the core diameter was 50 μm and the n value was 22, a breaking probability was made smaller than Example 3 because the core diameter was set smaller. As apparent from the above, it is recognized that the n value should be set to 22 or more, in order to suppress a breaking probability of the PCF whose core diameter was set to 50 to 100 μm smaller than 1 ppm.

(Amount of Increase in a Bend Loss)

An amount of increase in a bend loss was defined based on a difference between a transmission loss caused after the PCF was wound around the mandrel whose radius is 2 mm by 10 turns and a transmission loss caused before such PCF was wound. A wavelength of a signal light was set to 850 nm, and a transmission loss was measured by applying the cutback technique. Depending upon the configuration of the transmission system, in some cases it is requested that a bend loss should be suppressed to 1 dB or less in 10 turns. Therefore, it was decided that the bend loss of 1 dB/10 turns or less was good whereas the bend loss in excess of 1 dB/10 turns was failure.

(Allowable Bend Radius)

Regarding the PCF that was good in a bend radius of 2 mm in both the above breaking probability and the above amount of increase in a bend loss, an allowable bend radius of 2 mm was decided as good. The PCFs that were decided as good in radius of 2 mm are indicated with a O mark in Table 1. Regarding the PCF that was failure in either the breaking probability or the amount of increase in a bend loss, an allowable bend radius of 2 mm was decided as failure. The PCFs that were decided as failure in radius of 2 mm are indicated with a x mark in Table 1.

(Amount of Increase in a Transmission Loss after a Change in Temperature)

An optical cable whose outer diameter is 2 mm was built up by covering the coated PCF with a PVC tube while proving four Kevlar fibers of 1140 denier around this coated PCF. The heat cycle that ranges from −40° C. to 85° C. is applied to this optical cable. A holding time is set to 4 hours at −40° C. and 85° C., and a change in temperature is set to 1° C./min. A difference between a transmission loss caused before the heat cycle is applied and a transmission loss caused after the heat cycle is applied through 10 cycles corresponds to an amount of increase in a transmission loss after a change in temperature. A wavelength of the signal light was set to 850 nm.

(Connection Loss)

The connector was equipped to the coated PCF, and then the coated PCF of the same type was connected to this coated PCF. Then, a loss of the light signal caused at the connected location was measured and was defined as a connection loss. A wavelength of the signal light was set to 850 nm. The resin coating layer was removed from respective connection portions of the coated PCFs, and then end surfaces of the core and the cladding of the PCFs were connected together respectively.

Measured results of the coated PCFs in Examples 1 to 5 and Comparative Examples 1 to 5 are given in Table 1.

TABLE 1

| | Example 1 | Example 2 | Example 3 | Example 4 | Example 5 |
|---|---|---|---|---|---|
| Core profile | GI type | GI type | GI type | GI type | SI type |
| Core diameter (μm) | 50 | 50 | 80 | 100 | 80 |
| Cladding diameter (μm) | 125 | 125 | 125 | 150 | 120 |
| Cladding thickness (μm) | 37.5 | 37.5 | 22.5 | 25 | 20 |
| Core material | Ge-added silica | Ge-added silica | Ge-added silica | Ge-added silica | Ge-added silica |
| Cladding material | Acrylate fluoride resin | Acrylate fluoride resin | Acrylate fluoride resin | Acrylate fluoride resin | Acrylate fluoride resin |
| Core-cladding relative index difference (%) | 4.3 | 4.3 | 4.3 | 4.3 | 3.7 |
| NA | 0.42 | 0.42 | 0.42 | 0.42 | 0.40 |
| Static fatigue factor | 100 | 22 | 30 | 22 | 30 |
| Breaking probablity | $<10^{-9}$ | $<10^{-9}$ | $10^{-8}$ | $10^{-6}$ | $10^{-8}$ |
| Amount of increase of a bend loss (dB/10 turns) | 0.12 | 0.12 | 0.10 | 0.14 | 0.40 |
| Allowable bend radius (2 mm) | ◯ | ◯ | ◯ | ◯ | ◯ |
| Amount of increase in a transmission loss after temperature change (dB/100 m) | 0.08 | 0.07 | 0.08 | 0.05 | 0.02 |
| Connection loss (dB) | 0.50 | 0.50 | 0.35 | 0.40 | 0.30 |
| Allowable bend radius (2 mm) | ◯ | ◯ | ◯ | ◯ | ◯ |
| Amount of increase in a transmission loss after temperature change (dB/100 m) | 0.08 | 0.07 | 0.08 | 0.05 | 0.02 |
| Connection loss (dB) | 0.50 | 0.50 | 0.35 | 0.40 | 0.30 |

| | Comparative Example 1 | Comparative Example 2 | Comparative Example 3 | Comparative Example 4 | Comparative Example 5 |
|---|---|---|---|---|---|
| Core profile | GI type | GI type | GI type | GI type | GI type |
| Core diameter (μm) | 200 | 50 | 80 | 50 | 50 |
| Cladding diameter (μm) | 230 | 80 | 110 | 150 | 125 |
| Cladding thickness (μm) | 15 | 15 | 15 | 50 | 37.5 |
| Core material | Ge-added silica | Ge-added silica | Ge-added silica | Ge-added silica | Ge-added silica |
| Cladding material | Acrylate fluoride resin | Acrylate fluoride resin | Acrylate fluoride resin | Acrylate fluoride resin | Pure silica |
| Core-cladding relative index difference (%) | 3.3 | 3.3 | 3.3 | 3.3 | 1 |
| NA | 0.31 | 0.31 | 0.31 | 0.31 | 0.20 |
| Static fatigue factor | 18 | 18 | 18 | 18 | 18 |
| Breaking probablity | 0.4 | $<10^{-9}$ | $10^{-5}$ | $<10^{-9}$ | $10^{-4}$ |
| Amount of increase of a bend loss (dB/10 turns) | 1.4 | 1.2 | 1.6 | 1.2 | 19.6 |
| Allowable bend radius (2 mm) | X | X | X | X | X |
| Amount of increase in a transmission loss after temperature change (dB/100 m) | 0.02 | 5.1 | 3.2 | 0.03 | 0.02 |
| Connection loss (dB) | 0.30 | 0.30 | 0.25 | 3.2 | 0.30 |

As shown in Table 1, in Examples 1 to 5, an amount of increase in a bend loss caused when the PCF was bent in a radius of 2 mm was in the range of 0.10 to 0.40 dB/10 turns. These values were smaller than 1 dB/10 turns as the target value, and these values belong to the range within which no problem arises in practical use. In contrast, in Comparative Examples, an amount of increase in a bend loss caused when the PCF was bent in a radius of 2 mm was big to exceed 1 dB/10 turns. In some cases, a problem may arise in the system. In the case of a very small bend radius of 2 mm, an amount of increase in a bend loss was very big when the cladding is formed of the glass (Comparative Example 5), and the PCF cannot stand practical use.

When the cladding was formed of plastic, an amount of increase in a bend loss was smaller than that of the PCF in which the cladding is formed of the glass. However, when a relative index difference of the core to the cladding was small, an amount of increase in a bend loss could not be suppressed sufficiently small, as in Comparative Examples. From Examples and Comparative Examples, it was recognized that an amount of increase in a bend loss was increased when the core diameter was large; nevertheless a relative index difference of the core to the cladding was dominant over other factors in the amount of increase in a bend loss in the PCF.

In Examples 1 to 5, an amount of increase in a transmission loss caused due to a change in temperature was in the range of 0.02 to 0.08 dB/100 m, in which no problem may arise in practical use. In Comparative Example 2 and Comparative Example 3, an amount of increase in a transmission loss after a change in temperature was large and thus the coated PCF was failure. The reason for this may be guessed such that a microbend loss caused due to a change in temperature was increased. The cause for this may be considered such that a thickness of the cladding was set thin like 15 µm. In Comparative Example 1, it may be considered that a core diameter was large like 200 µm, and an amount of increase in a microbend loss caused due to a change in temperature was not increased even though the cladding is thin like 15 µm. Like present Examples, when a core diameter was set to 50 to 100 µm, it is preferable that an amount of increase in a transmission loss caused due to a change in temperature could be suppressed smaller as a thickness of the cladding is set thicker.

In Examples 1 to 5, a connection loss was in the range of 0.5 dB or less, in which no problem may arise in practical use. In Comparative Example 4, a connection loss is large like 3.2 dB, the cause of which may be considered such that the cladding was formed too thick. When the cladding is thick, an amount of offset of a center of the core from a center of the cladding was increased. In connecting the PCFs, these PCFs are connected such that respective outer peripheries of the claddings are matched closely. Therefore, when centers of the cores are offset from each other between respective PCFs that are connected together, a level difference was produced between the waveguides at connection locations. Accordingly, a part of the light that propagated through the core of one PCF was not incident into the core of the other PCF, and thus it may be considered that a connection loss was increased. Like present Examples, in case the core diameter was set to 50 to 100 µm, a connection loss was small when a thickness of the cladding was set to 37.5 µm or less, but a connection loss was suddenly increased when a thickness of the cladding became thicker to exceed 37.5 µm.

Figure 5:
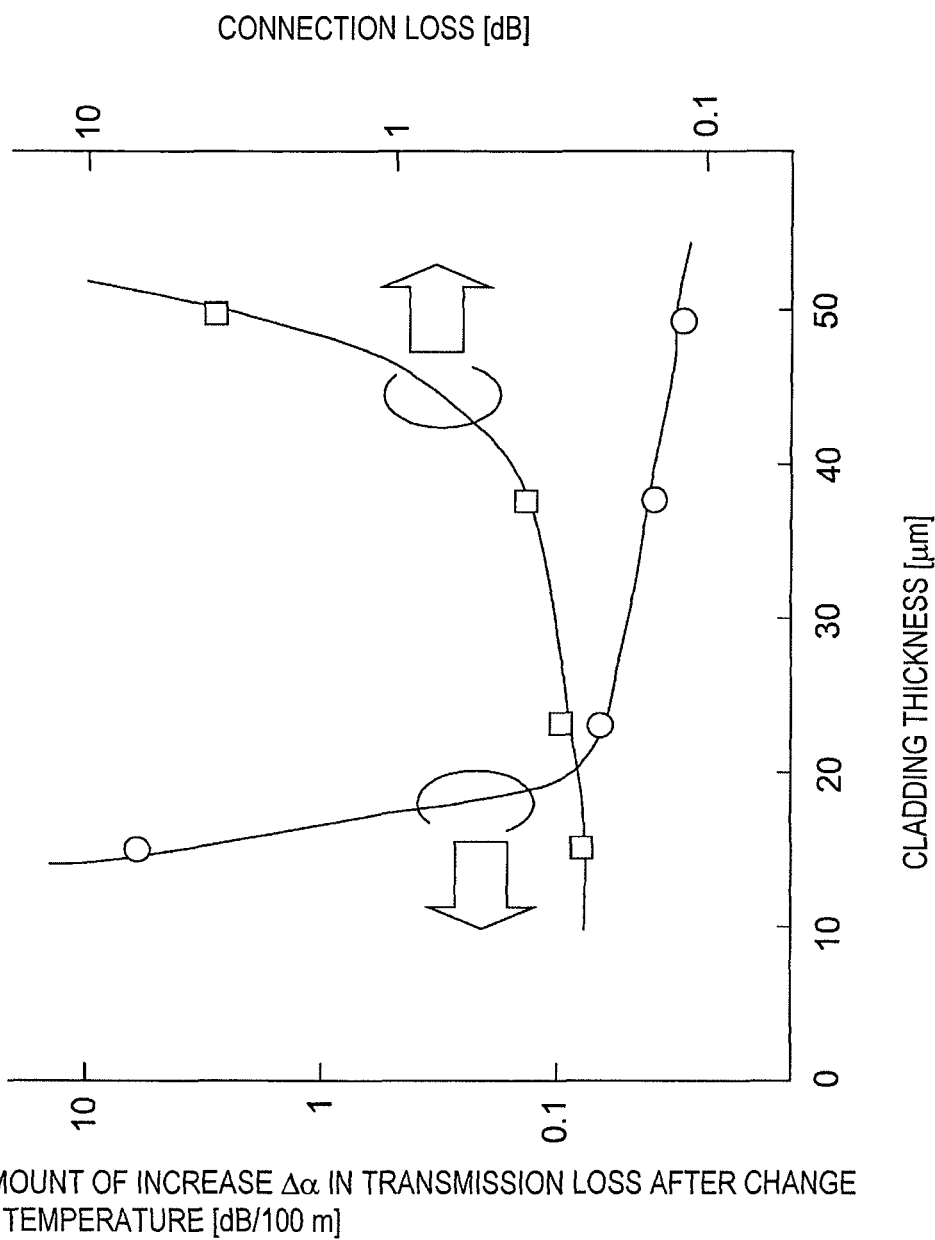
FIG. 5 A view showing a relation between a thickness of a cladding and an amount of increase in a transmission loss caused due to a change in temperature and also a relation between a thickness of a cladding and a connection loss.

With the above, it is preferable that, in the coated PCF (the core diameter is 50 to 100 µm) of the present invention, a thickness of the cladding should be set to 20 to 37.5 µm. Also, it is preferable that a ratio of the cladding diameter/the core diameter should be set to 1.4 to 2.5. A relation between a thickness of the cladding and an amount of increase in a transmission loss caused due to a change in temperature and a relation between a thickness of the cladding and a connection loss are shown in FIG. 5. An amount of a transmission loss caused due to a change in temperature or a connection loss was suddenly increased when these losses are out of the above ranges.

In the case where the optical fiber cable of the present invention is used as the cable for wiring between equipments, such as the USB cable, the HDMI cable, or the like, it is preferable from an aspect of long-term reliability that an allowable bend radius should be set to 2 mm. In Examples 1 to 5, an allowable bend radius can be set to 2 mm or less. Comparative Examples 1 to 5 are not preferable from an aspect of long-term reliability because an allowable bend radius is 2 mm or more. In particular, both Comparative Example 1 in which a core diameter was large like 200 µm and Comparative Example 5 in which the cladding was formed of glass are not preferable because the optical fiber cable is broken in a relatively short term when a bend radius is set to 2 mm.

With respect to the PCFs in Examples 1 to 5 and Comparative Examples 1 to 5, respective coupling efficiencies between the above PCFs and the vertical cavity surface emitting laser (VCSEL) will be described hereunder.

When an end surface of the PCF was pushed against the light emitting surface of VCSEL and then a light was irradiated onto the PCF from the VCSEL, an intensity of light that propagated through the PCF whose length was 3 m was measured. When the measured value of the PCF in Comparative Example 1 was set to 0 dB, the measured values of the PCFs in Examples 1 to 5 were more than 3.5 dB respectively. In case the coated PCFs of the present invention were coupled to the VCSEL in use, respective coated PCFs had a good coupling efficiency. In Comparative Examples 2 to 4, respective coupling efficiencies were almost −0.2 dB, and a coupling efficiency is worse rather than Comparative Example 1. The reason for this may be considered such that the core diameter is set small. In Comparative Example 5, a coupling efficiency was bad like −7 dB. The reason for this may be considered such that a relative index difference of the core to the cladding is small. It is recognized that, as the cause of the coupling efficiency to VCSEL, a relative index difference of the core to the cladding was superior to the core diameter.

A transmission band of the coated PCFs in Examples 1 to 5 was investigated. In Examples 1 to 4 in which the core is of the GI type, a transmission band was a wide band such as 18 Gbps/100 m. In Example 5 in which the core is of the SI type, a transmission band was 16 Gbps/2.5 m and was enough to use practically when a cable length is short.

The present invention explained in detail with reference to the particular mode, but it is apparent for those skilled in the art that various variations and modifications can be applied without departing from a spirit and a scope of the present invention.

This application is based upon Japanese Patent Application (Patent Application No. 2009-240536) filed on Oct. 19, 2009; the entire contents of which are quoted by reference. Also, all references quoted herein are incorporated as a whole.

INDUSTRIAL APPLICABILITY

The present invention can employ the coated plastic cladding optical fiber and the optical fiber cable for use in the USB cable or the HDMI cable (or cord) employed in ordinary houses, offices, etc., the portable phone, and the like.

DESCRIPTION OF REFERENCE NUMERALS

1 ... coated PCF, 2 ... core glass, 3 ... cladding layer, 4 ... PCF, 5 ... resin coating layer

The invention claimed is:

1. A coated plastic cladding optical fiber constructed by forming a coating layer, which is formed of a thermosetting resin, on a plastic cladding optical fiber, in which a cladding layer formed of a resin whose refractive index is lower than core glass is formed on an outer periphery of the core glass formed of quartz glass, wherein
a diameter of the core glass is set to 50 to 100 μm,
a diameter of the cladding layer is 1.4 to 2.5 times the diameter of the core glass,
a relative index difference of the core glass to the cladding layer is set to 3.7% or more,
a breaking probability of the core glass is $10^{-6}$ or less when a step that the plastic cladding optical fiber is wound around a mandrel of 2 mm radius by 10 turns and is held for one minute, then is unwound once, and then is wound once again and is held for one minute is repeated 100 times, and
a difference between a transmission loss of a signal light having a wavelength of 850 nm which is caused after the plastic cladding optical fiber is wound around the mandrel whose radius is 2 mm by 10 turns as measured by applying a cutback technique, and a transmission loss caused before the plastic cladding optical fiber is wound, is 1 dB or less.

2. The coated plastic cladding optical fiber according to claim 1, wherein the difference between the transmission loss of the signal light having a wavelength of 850 nm which is caused after the plastic cladding optical fiber is wound around the mandrel whose radius is 2 mm by 10 turns as measured by applying a cutback technique, and the transmission loss caused before the plastic cladding optical fiber is wound, is 0.4 dB or less.

3. The coated plastic cladding optical fiber according to claim 1, wherein a static fatigue factor of the plastic cladding optical fiber is set to 22 or more.

4. An optical fiber cable including the coated plastic cladding optical fiber set forth in claim 1.

5. The coated plastic cladding optical fiber according to claim 2, wherein a static fatigue factor of the plastic cladding optical fiber is set to 22 or more.

6. An optical fiber cable including the coated plastic cladding optical fiber set forth in claim 2.

7. An optical fiber cable including the coated plastic cladding optical fiber set forth in claim 3.

8. An optical fiber cable including the coated plastic cladding optical fiber set forth in claim 5.

* * * * *